United States Patent
Andrianov

(10) Patent No.: US 7,461,283 B2
(45) Date of Patent: Dec. 2, 2008

(54) SKIP COUNTER FOR SYSTEM TIMER

(75) Inventor: Vitaly Andrianov, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 608 days.

(21) Appl. No.: 11/087,140

(22) Filed: Mar. 23, 2005

(65) Prior Publication Data
US 2006/0217918 A1    Sep. 28, 2006

(51) Int. Cl.
*G06F 1/00* (2006.01)
(52) U.S. Cl. ..................................... 713/500
(58) Field of Classification Search ................. 713/500
See application file for complete search history.

(56) References Cited

U.S. PATENT DOCUMENTS

| | | | |
|---|---|---|---|
| 6,543,000 B1 * | 4/2003 | Wright | 713/500 |
| 6,965,763 B2 * | 11/2005 | Bussan et al. | 455/343.4 |
| 7,337,347 B2 * | 2/2008 | Kubo et al. | 713/503 |
| 2003/0046597 A1 * | 3/2003 | Shinkawa | 713/500 |

* cited by examiner

*Primary Examiner*—Nitin C Patel
*Assistant Examiner*—Mohammed H Rehman
(74) *Attorney, Agent, or Firm*—Steven A. Shaw; W. James Brady; Frederick J. Telecky, Jr.

(57) ABSTRACT

A skip counter timing device employing a typical hardware system timer, a skip counter with a skip count register, a signal gate and a hardware system tick counter as a single sleep mode enhancing skip counter. In an exemplary embodiment, said skip counter is operatively interconnected to a legacy operating system, with said operating system being configured for said interconnection. Use of said skip counter provides the benefits of: 1) allowing CPU shutdown during device sleep modes while 2) eliminating the need for the CPU to perform fractional mathematical calculations in recalculating accurate timer settings upon factional time-slice timer interrupt firings at CPU restarts and thus 3) avoiding overloading CPU resources at said restarts and 4) eliminating incremental and cumulative inaccuracies associated with recalculating timer settings in dynamic timer-managed systems.

2 Claims, 3 Drawing Sheets

SKIP COUNTER FOR SYSTEM TIMER

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to the field of electronic operating system timing devices. More specifically, the present invention is a common timing device operatively connected to a system tick count register and a skip counting interrupt controlling mechanism.

BACKGROUND OF THE INVENTION

System timers are used to drive time-sensitive operating processes such as task switches and system time keeping. A system timer is generally a hardware device that, once started, does not require interfacing with an operating system to keep its time accurate since it receives its timing signal from the system clock and automatically creates and sends out interrupts at time slices in multiples of the clock rate.

As shown in FIG. 1, hardware timers typically consist of a load register (6), a count-down register (7), and a controller (8). Operating process generated values (22A) are loaded into the load register. Depending on instructions of the controller, the value in the load register is transferred to the count-down register on a reference clock signal tick (9). The count-down register decrements its value on each successive clock tick, until a programmed value is reached (typically "0"), at which point the clock signal is passed through the timer as a timer interrupt (10), which passes to the operating system.

However, in many circumstances, timers are created by system software. These are referred to as dynamic timers. With dynamic timers, timer lists with calculated time settings are created and maintained by the operating system for each timer. Entries in the timer lists are associated with various devices and processes, controlled by the CPU, which often require a precisely timed interrupt for their operation. The precision of such an interrupt may involve a fraction of a system tick time slice. A system doze mode wake-up alarm is a simple example of a process which requires the assistance of timer-scheduled interrupts.

Timer list entries are based on a calculated number of whole and fractional system ticks (the delay) required between the system tick occurring as the timer set signal is received by the timer set-up routine and the point of time in the future that the interrupt must fire. Because the timers are created and maintained by software, dynamic timers require that a system's CPU be up and running to serve the timer's set-up and interrupt routines.

During normal operation, after a dynamic timer fires an interrupt, the CPU must walk through its timer lists and reconfigure any remaining timer settings, particularly when a timer has expired and fired its interrupt part-way through a system tick interval. This places a heavy demand on the operating system, especially since resource-intensive fractional mathematics are required to perform any partial time slice reset calculations as a result of such an interrupt. Since these recalculations must be done for each dynamic timer, the process of maintaining dynamic timers collectively consumes a large amount of valuable CPU resources.

As mentioned above, all interrupt setup times on a dynamic timer list are recalculated after each and every interrupt fires. The recalculations are based on (and thus reset from) the timing of the most recent interrupt. The actual system time required to make the reconfiguring calculations may vary depending on the number of entries in the timer list as well as on the number of other system tasks running simultaneously. Therefore, inaccuracies may occur as a result of repeated recalculations of a number of timers. Over time these inaccuracies accumulate, causing timer-related system problems.

Further, when devices are dependent on a dynamic timer system, the system CPU must remain up and running to serve the timer creation, time calculation and timer interrupt routines. On many portable devices, it would be desirable to put the CPU to "sleep", having it shut down completely to conserve battery power between operating events, especially if the device is designed for relatively long periods of time with no use. Since placing the CPU to sleep would require that the dynamic timer programs be shut down, it is not possible to shut down the CPU and conserve power where operating systems utilize dynamic timers to control system sleep modes.

These three deficiencies in legacy operating systems (utilizing system resources for factional mathematic calculations, creating inaccuracies as a result of repeated calculations and an inability to shut down the CPU to save battery power during sleep mode) create a need for an improvement to the current state of the art.

SUMMARY OF THE INVENTION

Addressing the deficiencies noted above, an invention is disclosed offering a remarkably simple solution. The invention comprises the introduction of a skip counter, a signal gate, and a system tick register, all of which are interposed between a CPU-independent hardware timer's output (i.e., a system timer's interrupt signal) and the CPU-driven operating system receiving said interrupt. The arrangement is shown in FIG. 2.

As is known in the industry, once a hardware timer is up and running, it may continue to run independent of the central processing unit (CPU) which controls much of the rest of the operating system. In the typical embodiment of the present invention, the hardware timer is configured to fire only constant, periodic interrupts. The skip counter and the logical gate are configured so as to be able to intercept those interrupt signals and control their transmittal to the remainder of the operating system in such a manner that the interrupt signal will only be delivered to the operating system after a certain amount of time (translated by the CPU as a specific number of timer interrupt signals) has transpired.

To create this effect, the output of the hardware timer (the system interrupt) is connected to the signal gate as a first of two inputs. The system interrupt is also connected to the skip counter as a first input. The output of the skip counter is taken as the second input to the signal gate. The skip counter's output signal, when present, acts as an enabling signal, enabling the signal gate to transmit the interrupt on to the remainder of the operating system.

As a future event (i.e., a system wake up call) is scheduled by a system process, the skip counter (rather than a timer) is set with a number in a countdown register which represents the number of system timer ticks desired until the sleeping process or device should receive an interrupt from the timer. This is shown as process line 23 in FIG. 3.

On each successive interrupt signal from the system timer, the value in the countdown register of the skip counter is reduced by one (1). Whenever the value in the skip counter's countdown register is greater than "0", no enabling signal is passed from the skip counter to the signal gate. This renders the gate not-enabled and the gate does not pass the timer interrupt signal (received as its first input) on to the downstream process. Under this condition, the CPU will not be receiving system ticks and will effectively be shut down. This process is indicated in the timing diagram of FIG. 4.

When the value in the countdown register reaches "0", the skip counter generates its enabling signal to the signal gate. Now, the signal from the timer is passed through the gate to the downstream process. This serves as the system's wake up call, bringing the sleeping operating system back to life. The enabling signal remains present until and unless a new non-zero value is sent to and stored in the countdown register of the skip counter.

As is mentioned above, at the first instance of the signal gate becoming enabled, the system timer's interrupt is passed through the gate to the operating system. At this point, the CPU is re-awakened and resumes normal operations, collecting any values it may have stored in non-CPU registers prior to being shut-down. However, since the CPU was turned off, its clock will have lost its sense of current system time.

To correct for this problem, the invention further teaches the introduction of the system tick register, which, like the signal gate and the skip counter, also receives the hardware timer interrupt as an input. However, in the case of the system tick register, the system tick is added to the count in the register, a process which is not dependent on any other device or signal. The register keeps track of the ongoing number of system ticks regardless of the status of the remainder of the system operation.

Therefore, as the CPU awakens, one of its first acts is to check the count in the system tick register and thus bring its internal clock up to date with the current time.

Following that, any remaining dynamic timer settings from the previous timer list (which would have been stored for retrieval prior to CPU shutdown) are adjusted based on the number of whole system ticks which transpired during the CPU sleep period. No fractional calculations are required to be performed during this adjustment, since the re-awakening interrupt fired coincident with a system tick. This reduces, as compared to the legacy systems, the processing demand on the CPU during restart.

Finally, because of the relatively simple (whole system tick) adjustments to the timer settings, inaccuracies related to the amount of elapsed time it takes to recalculate and adjust them are virtually eliminated.

BRIEF DESCRIPTION OF THE DRAWINGS

Exemplary embodiments of the invention are discussed hereinafter in reference to the following drawings, in which.

DETAILED DESCRIPTION OF THE PREFERRED EXEMPLARY EMBODIMENTS

Figure 2:
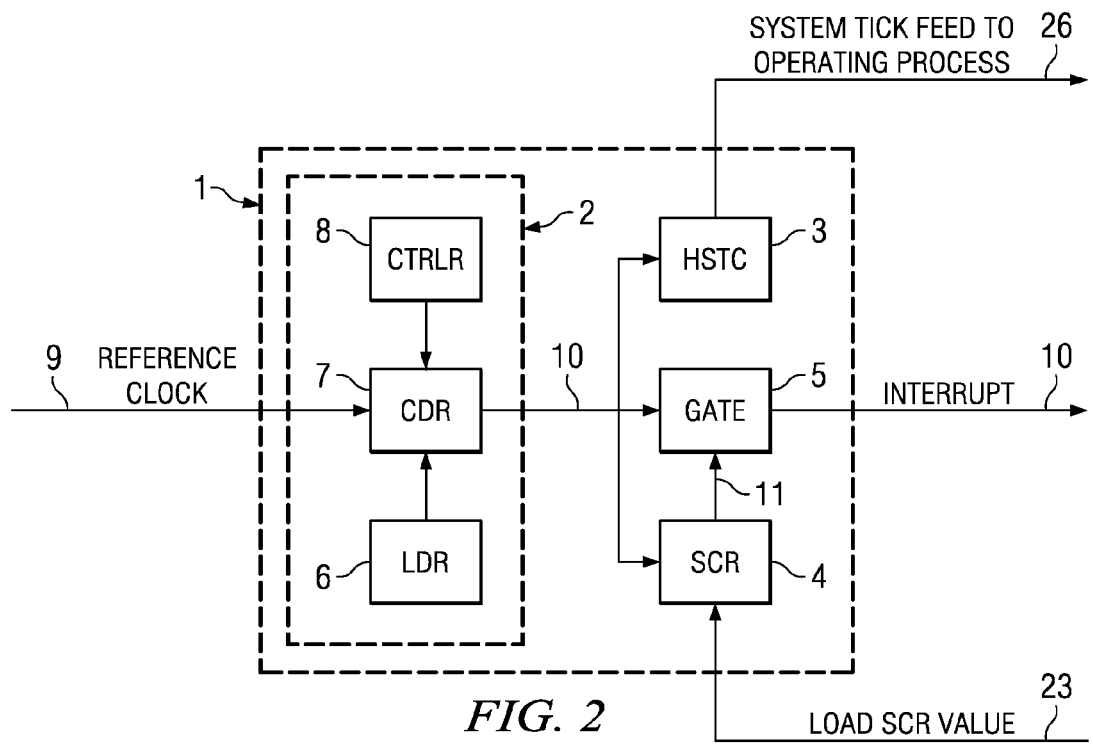
FIG. 2 is a schematic representing the invention comprising a common hardware timing device operatively connected to a system tick count register, a signal gate and a skip counting interrupt controlling mechanism.

The present invention comprises a timing device 1, as shown in FIG. 2, comprising a known hardware system timer 2 operatively connected to a known hardware system tick counter (HSTC) 3, a known skip count register (SCR) 4 and a known signal gate 5.

In an exemplary embodiment of the invention, known hardware timer 2 comprises a known load register (LDR) 6, a known count-down register (CDR) 7 and a known control register (CTRLR) 8. Count-down register 7 receives a known reference clock signal 9 as an input. In the known use of hardware timer 2, count-down register 7, if enabled, generates a periodic timer interrupt 10, which, in timing device 1 of the present invention, is passed simultaneously to HSTC 3, SCR 4 and signal gate 5.

Hardware system tick counter (HSTC) 3 stores a non-negative integer variable in a known internal counter register (not shown). The HSTC receives timer interrupt 10 as a hardware system tick, and increments the variable stored in said count register by one at each said interrupt.

Skip Count Register (SCR) 4 has the ability to store a non-negative integer variable in a known internal countdown register (not shown) and also receives timer interrupt 10 as a system tick. The SCR decrements by one any non-zero variable stored in said countdown register until said value in SCR 4 reaches "zero". When the value in SCR 4 reaches zero, the SCR passes an enabling signal 11 to signal gate 5, causing gate 5 to become enabled. Otherwise, no enabling signal is sent to gate 5, and the gate is not enabled.

Signal gate 5 also receives timer interrupt 10 as a system tick. If said gate is enabled by signal 11 from SCR 4, timer interrupt 10 is passed through said gate, and on to downstream operations.

Figure 3:
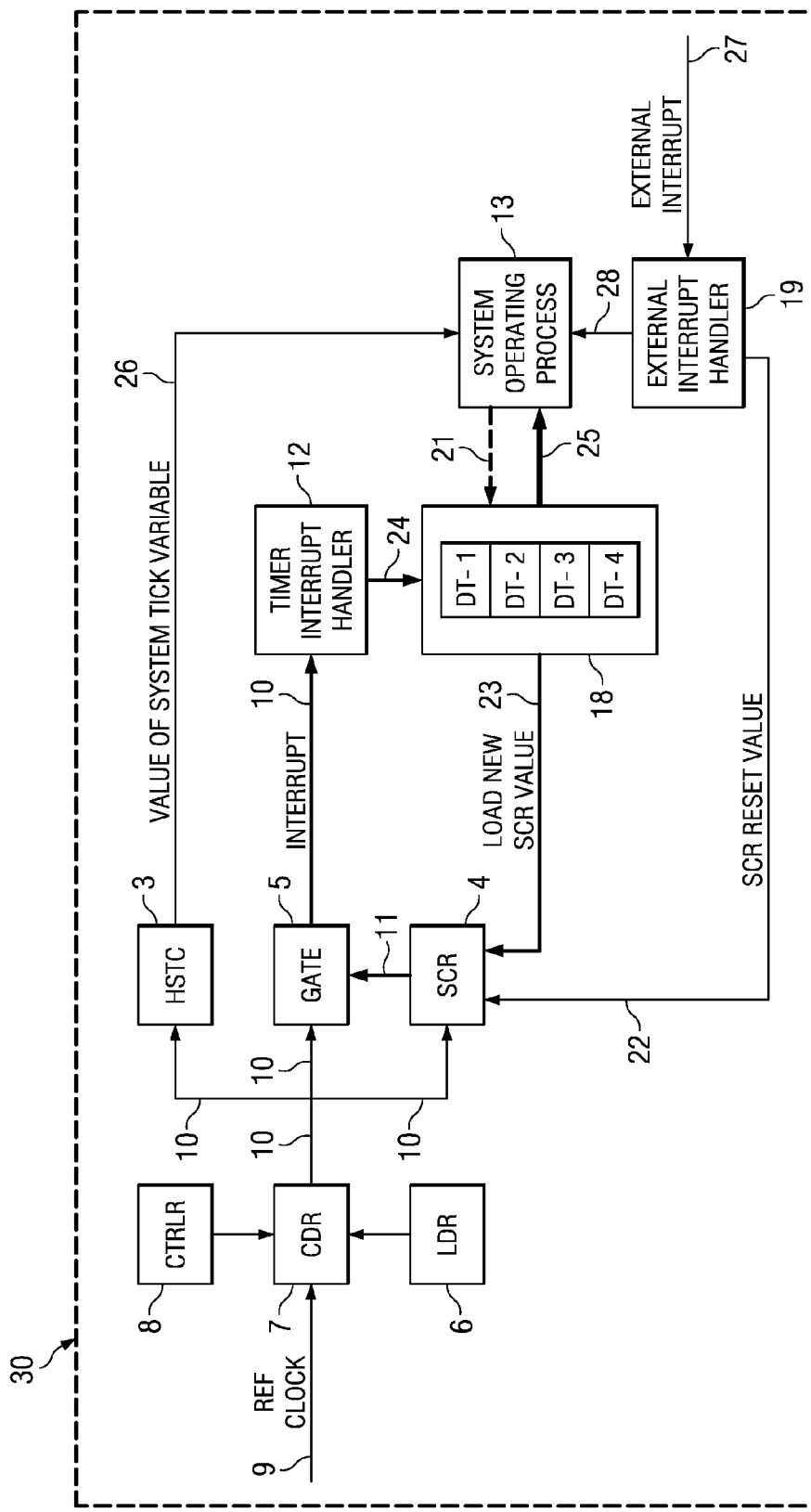
FIG. 3 is a schematic representing an exemplary use of the invention operatively integrated into a commonly known operating system which has been reprogrammed for said integration.

In an exemplary application of the above embodiment of the invention, FIG. 3 depicts the hardware components of timing device 1 integrated into an operating system 30, comprised in part of said timing device, a known timer interrupt handler 12, known system operating process 13, known dynamic timers DT-1, DT-2, DT-3 and DT-4, known dynamic timer routine 18, and known external interrupt handler 19.

Timer interrupt handler 12, system operating process 13, dynamic timers DT-1, DT-2, DT-3 and DT-4, dynamic timer routine 18, and external interrupt handler 19 are all hypothetical virtual components (i.e., created and maintained by software) of operating system 30. Interrupt handler 12 is operatively connected at its input to the output of signal gate 5. If gate 5 is enabled by enabling signal 11, interrupt 10 propagates through gate 5 to interrupt handler 12. Dynamic timer routine 18 in part manages the operation of dynamic timers DT-1 through DT-4, including maintaining timer lists and facilitating said timers' interfaces with other parts of said operating system.

Figure 1:
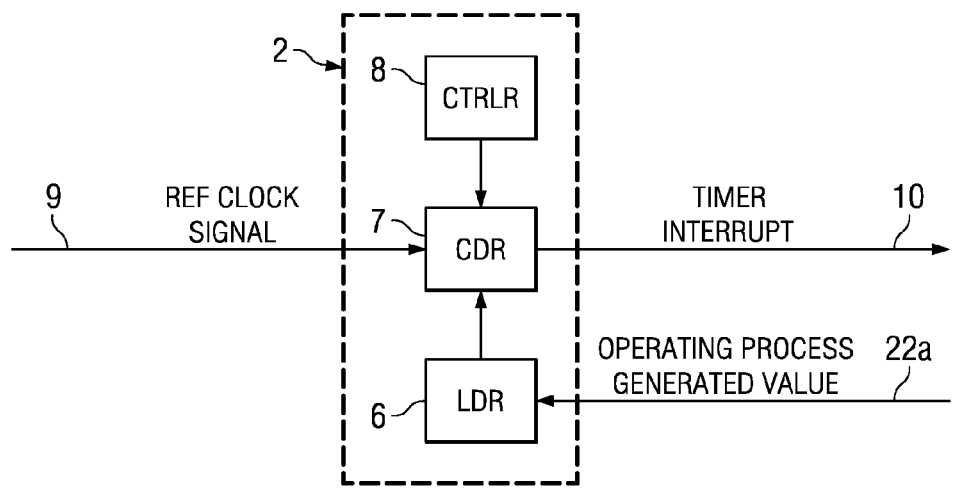
FIG. 1 is a schematic representing a commonly known system hardware timing device.

In this exemplary application, and contrary to the process depicted in FIG. 1, system operating process 13 transmits no values (shown as 22A in FIG. 1) to load register 6. This permanently enables count-down register 7 and permits hardware timer 2 to constantly generate periodic timer interrupts 10 to the other components of timing device 1, as is shown in FIG. 2.

During normal exemplary operation of the application of the present invention, and as depicted in FIG. 3, operating process 13 requests the creation of one or more dynamic timers (in this example, DT-1 through DT-4), as required for certain time-related system operating processes. This request is made via a known dynamic timer creation/update request 21. In this application, said dynamic timers calculate time settings for system wake-up points, should the operating system be asleep at those points in time.

Upon any prompt to the operating system by process 13 to enter sleep mode, timer routine 18 performs a check of all its timer settings to determine the next nearest programmed wake up time. A skip-count value 23, which is associated with said closest wake up time setting, is sent from routine 18 to SCR 4. Other, later wake up times are stored in a non-volatile register (not shown) for recall later. Skip-count value 23 is received by the SCR as a SCR countdown value corresponding to the anticipated sleep period for the associated timer's wake up time setting. This new, non-zero value in the register of SCR 4 prevents enabling signal 11 from enabling signal gate 5. Interrupt signal 10 is thus prevented from passing through gate 5 to the downstream system. This effectively shuts down process 13, including the system's CPU, allowing it to enter sleep mode.

Figure 4:
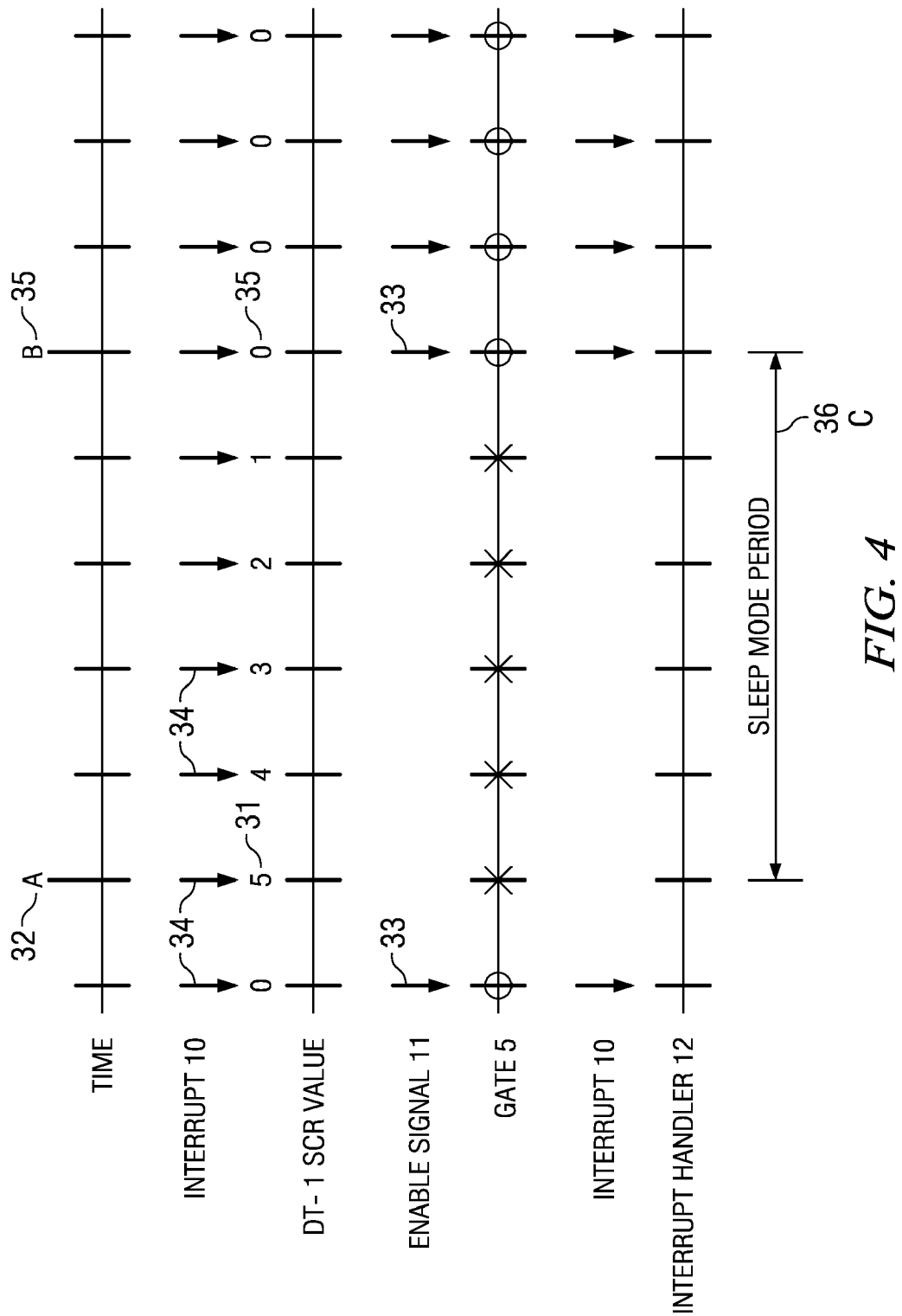
FIG. 4 is a time plot representing the effects of the use of the skip timer of the present invention on the interfaces between a timer interrupt signal, a skip count register, a gate, a gate enabling signal from the skip count register and an interrupt handler.

FIG. 4 illustrates an example where skip-count value 23 is received by SCR 4 as a value of "five", corresponding, to a calculation for a sleep period from, say, dynamic timer DT-1. Set value "5" (shown as 31 in FIG. 4) is received from said timer by SCR 4 at time point A (shown as 32 in FIG. 4) and is stored in the countdown register of the SCR. Enabling signal 11 (shown as 33 in FIG. 4) does not pass from the SCR to signal gate 5 due to the presence of the non-zero value stored in the countdown register. Thus, signal gate 5 is not enabled and will not permit timer interrupts 10 (shown as 34 in FIG. 4) to pass through itself and on to interrupt handler 12.

Upon each subsequent timer interrupt 10 received from count-down register 7, enabling signal 11 is withheld from signal gate 5 (keeping it disabled) and, at the same time, the integer value in SCR 4 is reduced by one. This continues until the value stored in SCR 4 reduces to "zero" (shown as 34 in FIG. 4). Consequently, during the period of time that the value in SCR 4 is greater than zero (a total of 6 system ticks), no interrupt 10 is passed through gate 5 to interrupt handler 12. In this example then, there would be a period of six system ticks during which period interrupts 10 will not reach interrupt handler 12. During this period, operating system 30 ceases normal, hardware timer interrupt-driven operations.

When the value in SCR 4 reaches "0", as shown at time point B (shown as 35 in FIG. 4), SCR 4 begins passing enable signal 11 to signal gate 5 again, and gate 5 becomes enabled so that the interrupt signal is allowed to pass through gate 5 to interrupt handler 12. This interrupt prompts operating process 13 (not shown) to begin waking up for normal (wake mode) operations. In the time period C (shown as 36 in FIG. 4) between time points A and B, the operating system is in "sleep mode" as had been requested by process 13 and limited by the setting of dynamic timer DT-1.

As shown in FIG. 3, upon resumed receipt of timer interrupt 10, interrupt handler 12 sends prompt signal 24 to timer routine 18. Timer routine 18 reinstates the dynamic timer lists, using the values stored in the non-volatile registers prior to entering sleep mode. Then timer routine 18 checks to see which of its timers has just expired. A dynamic timer interrupt 25, which is associated with the expired timer (in this case DT-1), is passed from dynamic timer routine 18 to the appropriate system callback routine of system operating process 13. This callback routine prompts the associated parts of the operating system to wake up and restart normal operations.

It is important to note that, during sleep time period C, hardware system tick counter 3 continues to receive system ticks from CDR 7, thus keeping the total system tick count up to date. System process 13, upon waking from its sleep period, retrieves the current value of the system tick variable 26 from hardware system tick counter 3 to use for its current time count as it recommences operation.

Process 13 now resumes full operation and, among other things, recalculates settings for remaining timers DT-2, DT-3 and DT-4 based on the current situation in system operation process 13. It may also request new timers for dynamic timer routine 18. Process 13 passes this timer recalculation and any new timer information on to timer routine 18 through dynamic timer creation/update request 21 as before, and upon indication from process 13 that the system will enter sleep mode at a new time point A, the entire cycle repeats itself as described above.

In the exemplary application, it is possible that there may be some reason for the system to wake up prior to the value stored in SCR 4 reaching zero. For example, an external interrupt 27 (a keyboard stroke, perhaps) may be received by operating system 30. In this case, the interrupt is handled by external interrupt handler 19, which immediately sends a reset value 22 of "0" to SCR 4 and interrupt information signal 28 to system operating process 13.

In the above instance, SCR 4 fires enabling signal 11 to signal gate 5, allowing passage of interrupt 10 to interrupt handler 12 on the next signal from CDR 7. Timer routine 18 searches its timers for one that has expired, but finding none, sends a non-associated timer interrupt 25 to process 13, prompting it to act on signal 28 being received from external interrupt handler 19.

With the system once again operating, process 13 recalculates timers DT-1 through DT-4 based on the current value of system tick variable 26 and the system is restored to normal waking operations.

The above exemplary embodiment is a hypothetical arrangement of the skip counter of the present invention with an imaginary operating process. Many other processes may be employed in other arrangements without departing from the teachings of the invention.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

The invention claimed is:

1. A method of maintaining accuracy in a system of dynamic timers within an electronic operating system utilizing a skip counter timing device operatively integrated into said operating system which, among other things, provides a skip time set value and receives a conditional timer interrupt signal, wherein:

said timing device comprises the primary components of:
a hardware system timer, configured to receive a reference clock signal and to generate a periodic timer interrupt signal as an output;
a skip counter, including a countdown register, configured to receive said periodic timer interrupt signal and said skip time set value, which, upon receipt, is stored in said countdown register as a countdown value, which is decremented by one upon receipt by said skip counter of each subsequent said periodic timer interrupt signal; and further configured to generate, as an output, a conditional enabling signal upon the reduction of said countdown value to zero (0); and a signal gate configured to also receive said periodic timer interrupt and said conditional enabling signal and, upon receipt of said enabling signal, to pass said periodic timer interrupt signal through said signal gate, to emerge, as an output of said gate, as said conditional timer interrupt signal;

said method comprising the steps of:

generating said system of dynamic timers, comprising:

a first expiring dynamic timer; and remaining dynamic timers;

calculating a first skip time set value associated with said first expiring dynamic timer;

sending said first skip time set value to said timing device as a first countdown value;

receiving from said timing device a first conditional timer interrupt signal associated with said first countdown value;

associating said first conditional timer interrupt signal with said first expiring dynamic timer for use by said operating system;

adjusting remaining times of said remaining dynamic timers based on said first skip time set value;

determining a next expiring dynamic timer within said system of dynamic timers; and repeating said method beginning with the second step above for said next expiring dynamic timer.

2. A method of enabling a Central Processing Unit (CPU) utilizing a system of dynamic timers within an electronic operating system to shut down between dynamic timer interrupts by utilizing a skip counter timing device operatively integrated into said operating system which, among other things, provides a skip time set value, receives a conditional timer interrupt signal and receives a system tick count, wherein:

said timing device comprises the primary components of:

a hardware system timer, configured to receive a reference clock signal and to generate a periodic timer interrupt signal as an output;

a skip counter, including a countdown register, configured to receive said periodic timer interrupt signal and said skip time set value, which, upon receipt, is stored in said countdown register as a countdown value, which is decremented by one upon receipt by said skip counter of each subsequent said periodic timer interrupt signal; and further configured to generate, as an output, a conditional enabling signal upon the reduction of said countdown value to zero (0);

a signal gate configured to also receive said periodic timer interrupt and said conditional enabling signal and, upon receipt of said enabling signal, to pass said periodic timer interrupt signal through said signal gate, to emerge, as an output of said gate, as said conditional timer interrupt signal; and a system tick counter, including a count maintenance register configured to also receive said periodic timer interrupt signal and, upon receipt of said periodic timer interrupt signal, to increment said system tick count maintained in said count maintenance register by a value of one (1), and to distribute the value of said system tick count as an output;

said method comprising the steps of:

generating said system of dynamic timers, comprising:

a first expiring dynamic timer; and remaining dynamic timers;

calculating a first skip time set value associated with said first expiring dynamic timer;

sending said first skip time set value to said timing device as a first countdown value;

storing in storage registers, as remaining times associated with said remaining dynamic timers, time periods remaining before expiry of said remaining dynamic timers;

shutting down said CPU;

receiving from said timing device a first conditional timer interrupt signal associated with said first countdown value;

waking up said CPU;

receiving from said timing device a first system tick count associated with said receipt of said first conditional timer interrupt signal;

updating system time within said CPU according to said first system tick count;

associating said first conditional timer interrupt signal with said first expiring dynamic timer for use by said operating system;

recalling said remaining times from said storage registers;

adjusting said recalled remaining times of said remaining dynamic timers to current remaining times based on said first skip time set value;

determining a next expiring dynamic timer within said system of dynamic timers; and repeating said method beginning with the second step above for said next expiring dynamic timer.

* * * * *